United States Patent [19]

Tan

[11] 4,280,176
[45] Jul. 21, 1981

[54] MEMORY CONFIGURATION, ADDRESS INTERLEAVING, RELOCATION AND ACCESS CONTROL SYSTEM

[75] Inventor: Kwang G. Tan, Poughkeepsie, N.Y.

[73] Assignee: International Business Machines Corporation, Armonk, N.Y.

[21] Appl. No.: 973,466

[22] Filed: Dec. 26, 1978

[51] Int. Cl.³ .............................................. G06F 9/26
[52] U.S. Cl. .................................................. 364/200
[58] Field of Search ... 364/200 MS File, 900 MS File

[56] References Cited

U.S. PATENT DOCUMENTS

| 3,737,870 | 6/1973 | Carter et al. | 364/200 |
| 3,787,813 | 1/1974 | Cole et al. | 364/200 |
| 3,796,996 | 3/1974 | Curley et al. | 364/200 |
| 3,806,881 | 4/1974 | Miwa et al. | 364/200 |
| 3,958,222 | 5/1976 | Messina et al. | 364/200 |
| 4,037,215 | 7/1977 | Birney et al. | 364/200 |

OTHER PUBLICATIONS

Fox et al., "Storage Reconfiguration", IBM Techn. Discl. Bull. vol. 15, No. 12, May 1973, pp. 3587-3591.

Primary Examiner—Gareth D. Shaw
Assistant Examiner—Thomas M. Heckler
Attorney, Agent, or Firm—Bernard M. Goldman

[57] ABSTRACT

A storage configuration table (BCA) has a plurality of register entries which are loaded with signals that assign absolute addresses to the physical locations in a computer system's main storage, which may have plural basic storage modules (BSMs). Each BCA entry contains plural fields which relate a range of absolute addresses to a BSM section, including (1) a port select field which assigns a BSM port, (2) a BSM select field which assigns one of plural BSMs connected to the port, (3) a BSM section modified field to change the BSM section assigned to the range of absolute addresses, and (4) a restricted system area (SA) range select field that can assign a SA to a respective BSM section, and specify the SA size. Each processor may restrict SA accesses to microprogram controlled storage operations under control of an authorization field in a storage request. The SA can flexibly be located in any one or more BSMs. A processor storage request provides selected fields to a BCA indexing circuit to locate the BCA entry which will indicate the assignment of physical storage to the absolute address of the request. The BCA indexing circuit includes an interleavemode trigger which selects among plural fields in the request address in order to control BSM switching in a continuous absolute address sequence of requests. The two trigger settings control interleaved switching of BSM sections whenever requests address a different one megabyte BSM section, or a different two kilobyte storage block.

16 Claims, 14 Drawing Figures

FIG. 2 (BSM CONFIG. AND ADDRESS RANGE CONTROL 10)

(PORT AND BSM SELECT CIRCUITS 12)

(BSM SECTION SELECT CIRCUITS 13)

FIG. 5 (SA ACCESS CHECK CIRCUITS 14)

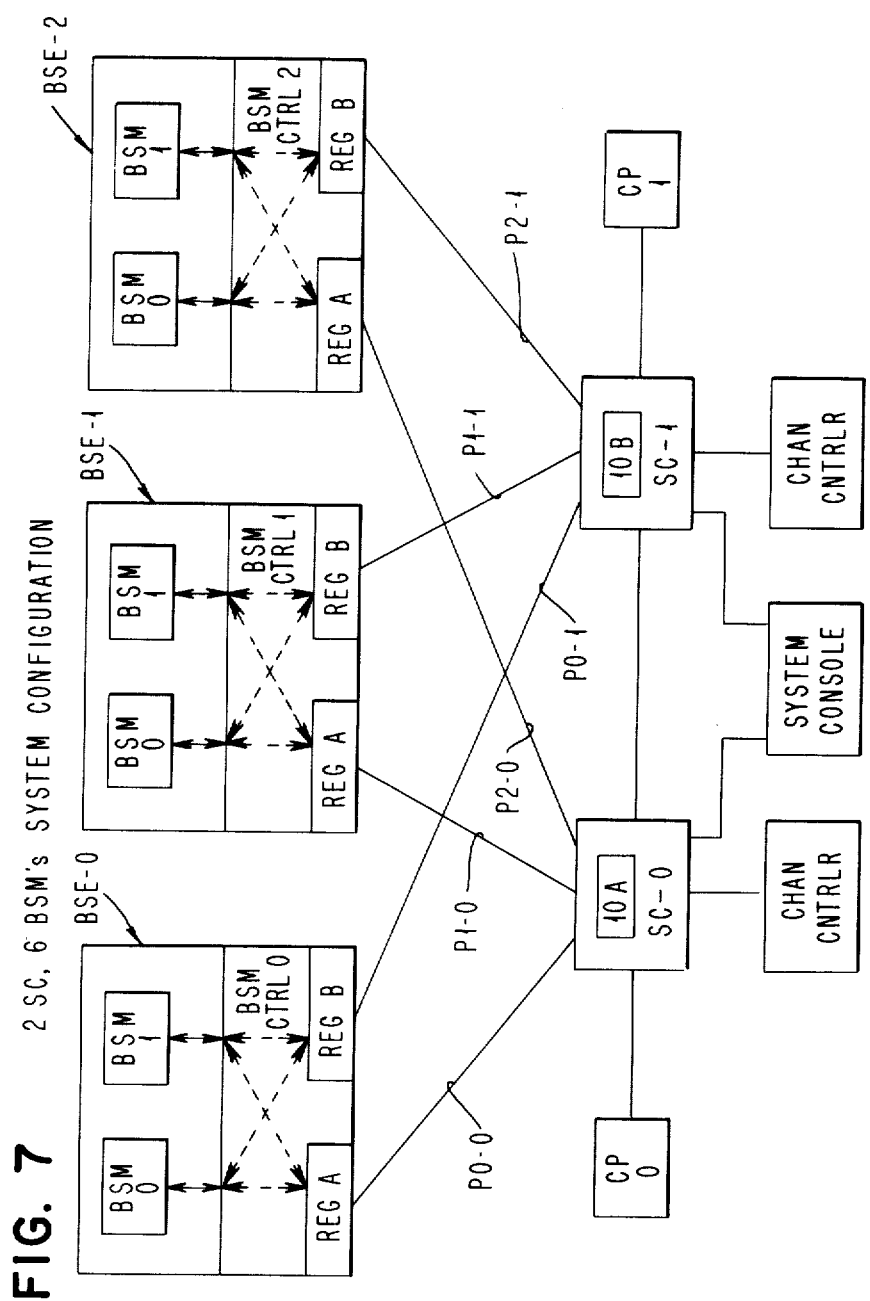
FIG. 7  2 SC, 6 BSM's SYSTEM CONFIGURATION

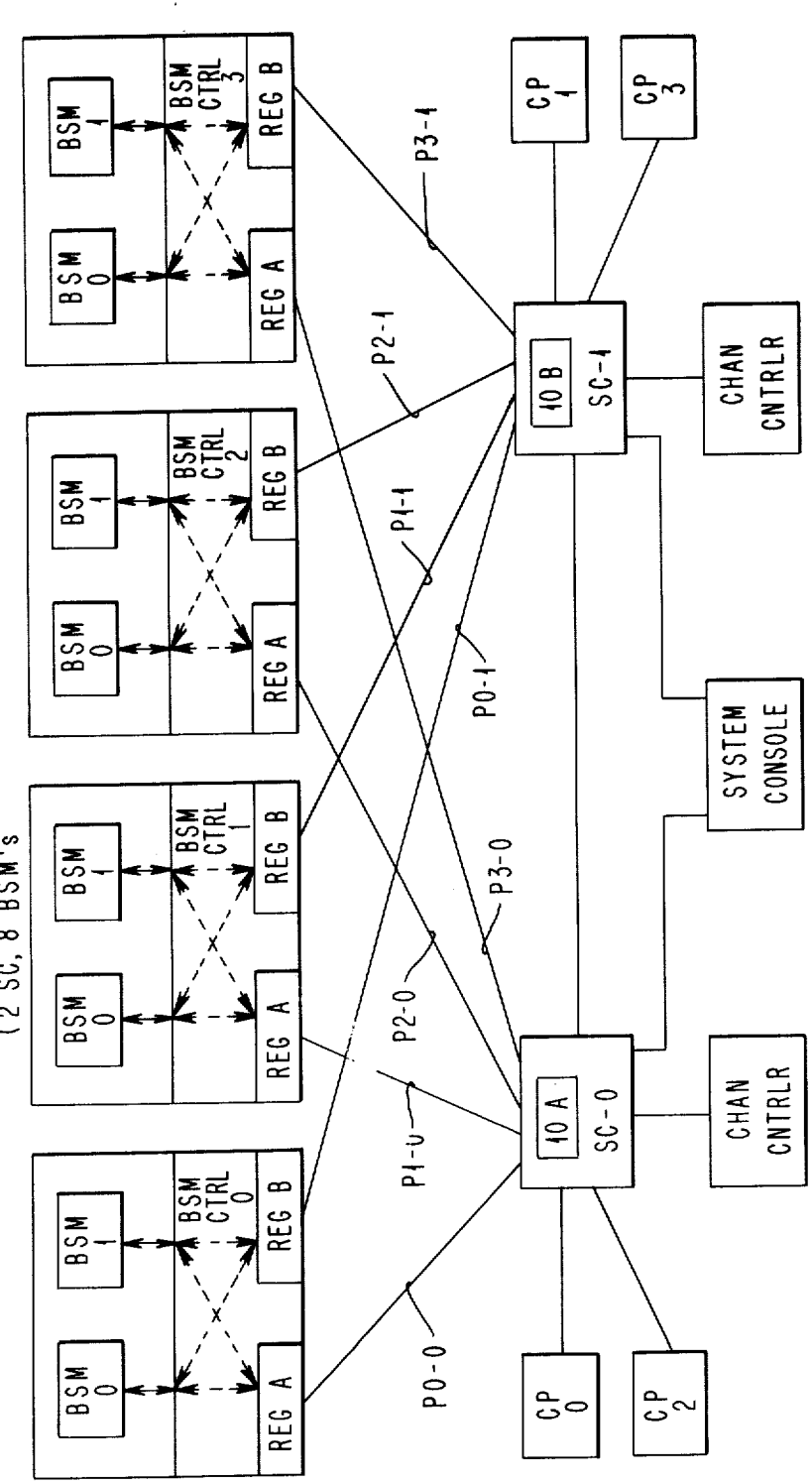

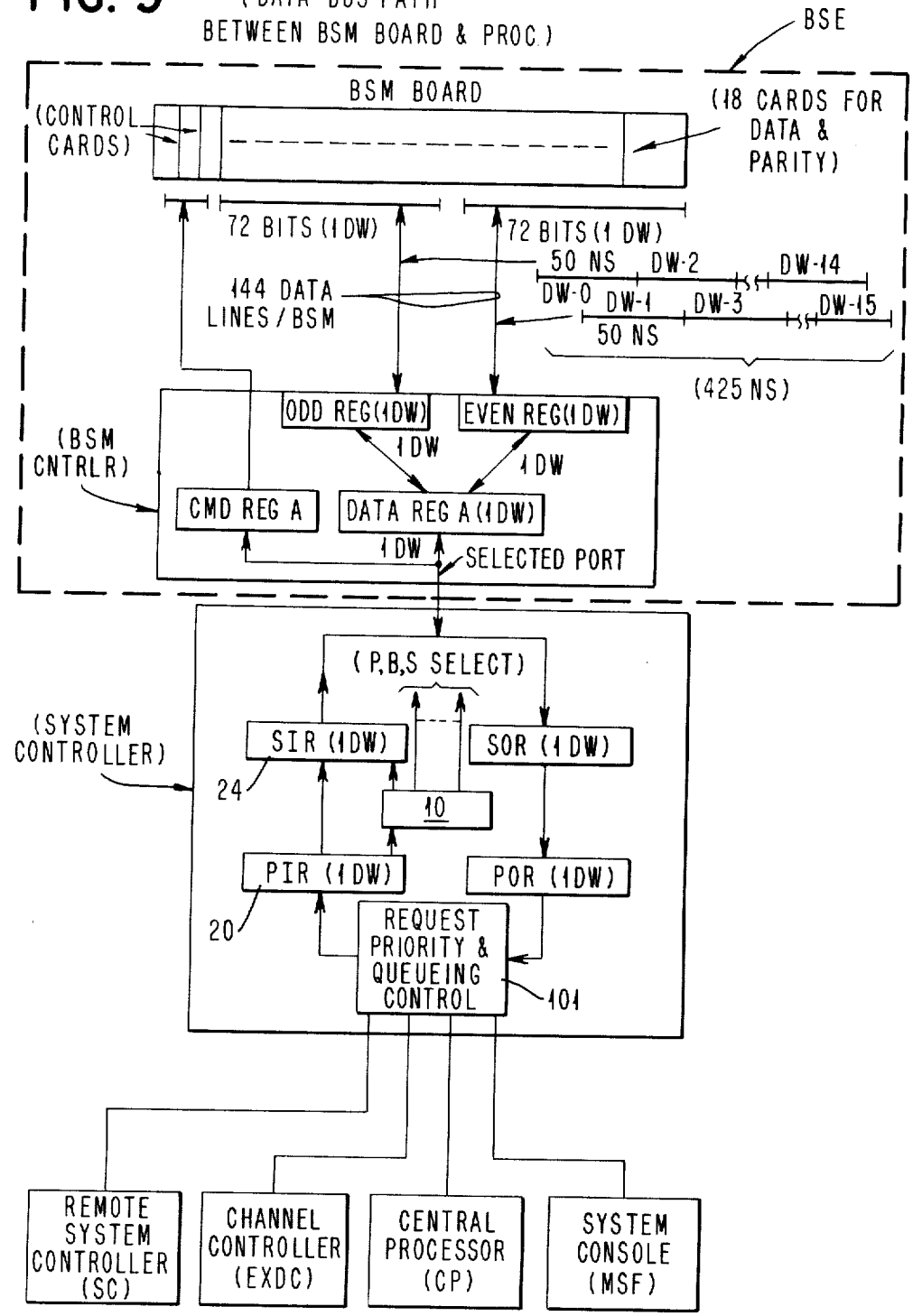

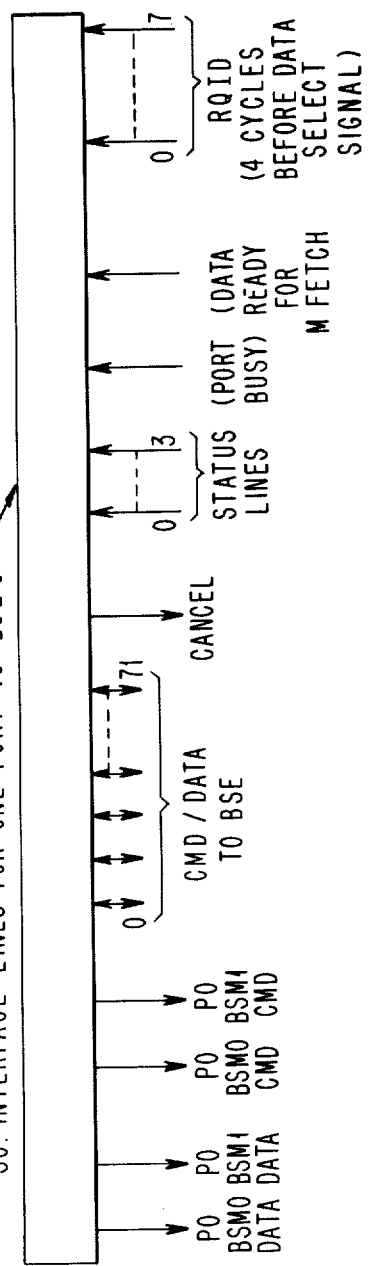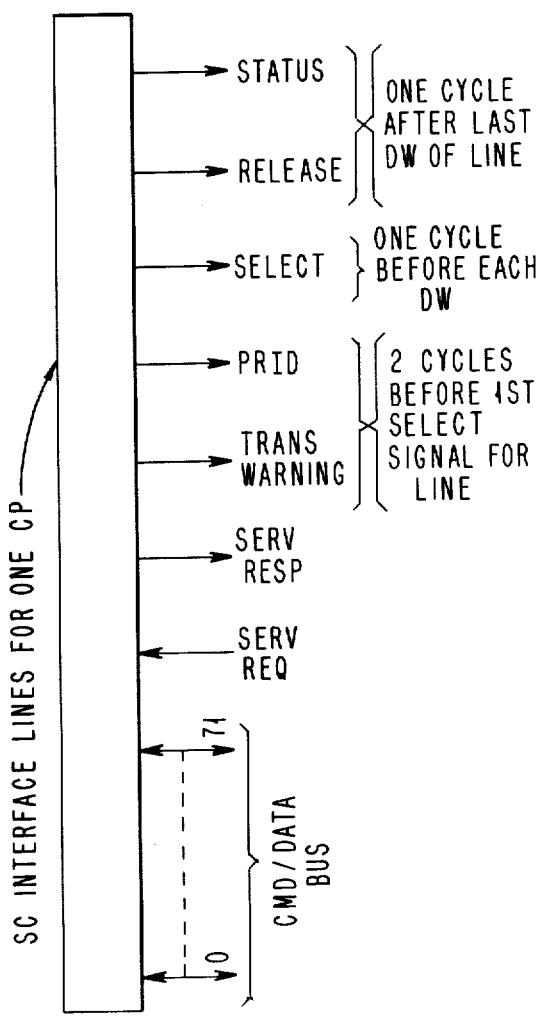
FIG. 10A
FIG. 10B

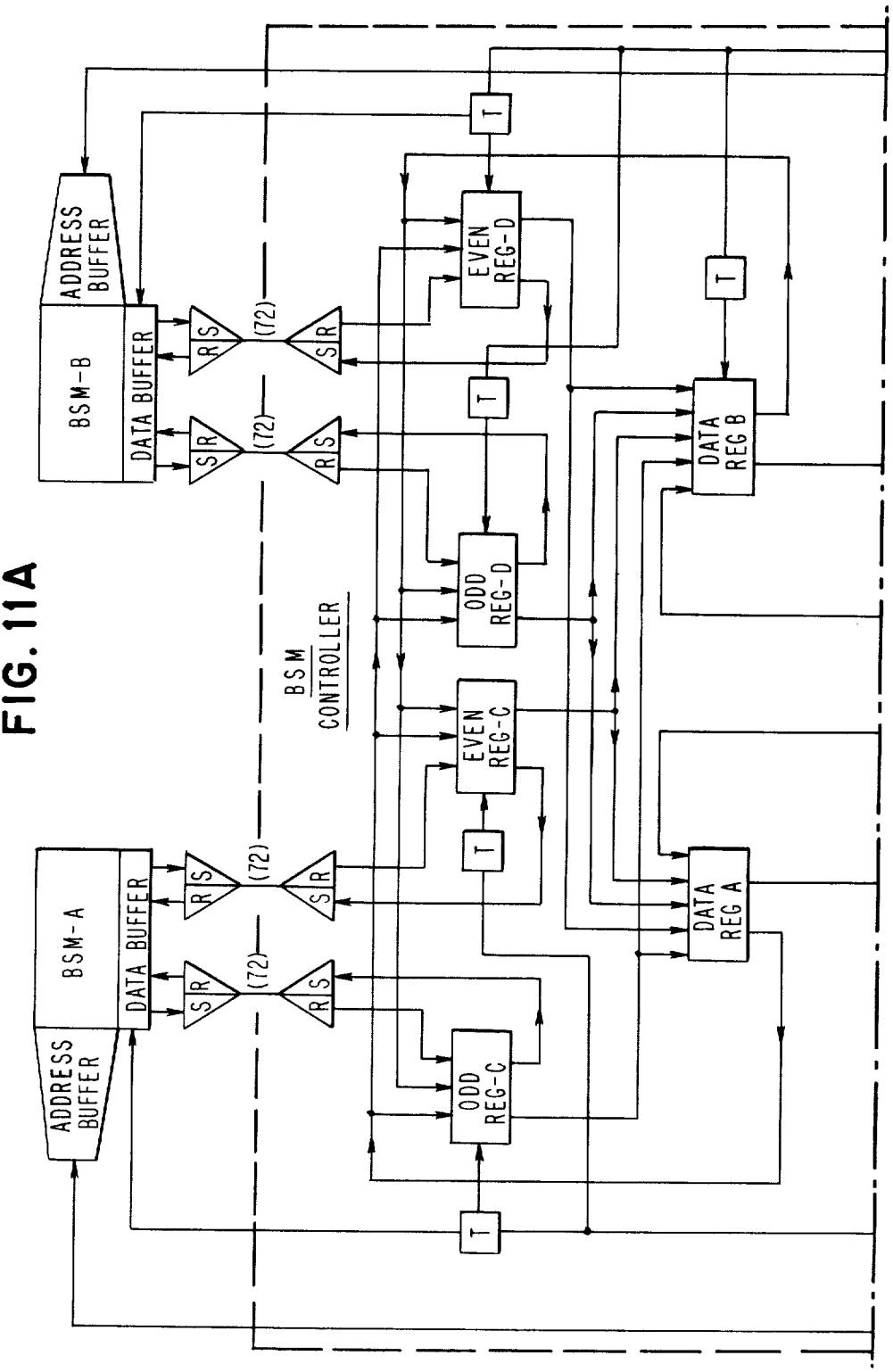

ABSOLUTE ADDRESS RANGES

MEMORY CONFIGURATION, ADDRESS INTERLEAVING, RELOCATION AND ACCESS CONTROL SYSTEM

INTRODUCTION

This invention relates to configuration and accessing control of main storage in a data processing system.

BACKGROUND

Absolute addresses are processor addresses after any required dynamic address translation and prefixing is performed. The assignment of absolute addresses to the physical main storage hardware was initially done by fixed wiring of the storage array hardware in the storage system. Later processors had several storage array hardware modules, sometimes called basic storage modules (BSMs). Plural BSMs are essential for some types of interleaved storage operations. It was recognized that flexibility was desirable in assigning processor absolute addresses to the BSMs, and this was done by providing manually changeable wiring, via a plugboard.

PRIOR ART

Flexible storage reconfiguration and interleaving schemes have been suggested in the prior art. U.S. Pat. No. 3,958,222 (Messina et al) uses an associative memory table to decode absolute addresses into physical addresses. U.S. Pat. No. 3,806,881 (Miwa et al) provides a circuit arrangement which permits the interleaving factor to be varied for a plurality of modules in main storage by activating different control lines. U.S. Pat. No. 3,796,996 (Curlee et al) permits the interleaving factor among a plurality of storage modules to be decreased, thereby reconfiguring modules out of main storage so they can be diagnostically tested concurrently with running user programs in the remaining modules in main storage.

SUMMARY OF THE INVENTION

Objects of this invention are:
1. To provide easy main storage configuration and reconfiguration by means of loading the content of entries in a table, in which the entries are addressed by fields in a requested absolute address.
2. To provide simple means for changing the interleaving mode without reconfiguring main storage.
3. To provide simple BSM interleave and non-interleave control by means of a mode signal.
4. To provide simple means for mapping and remapping absolute addresses into physical locations in a main storage having any number of BSMs.
5. To provide a simple means for variably mapping absolute addresses into the physical locations within any section of any of the BSMs comprising main storage.
6. To provide simple means for easily permitting changes in the number of BSMs comprising main storage at any time.
7. To enable BSM reconfiguration or interleave reconfiguration within or among one or plural BSMs by merely reloading a table with a different set of values under microcode control.
8. To provide a simple means for delineating a restricted area in main storage which is non-accessible to a user of the system instruction set but is accessible to processor microprogram operation.
9. To enable changing the size of a restricted area in main storage by merely changing a size indication for the restricted area in an entry of a main storage configuration table under microcode control. Whatever storage area is not assigned to the restricted area is available for normal storage use.
10. To simplify diagnostic operations for main storage by being able to eliminate from main storage any failing BSM section, to remap its absolute addresses into an operational BSM section, and to reduce the overall absolute addresses mapped into main storage by a corresponding amount.
11. To permit fast micro-program controlled diagnostic operations of removing a failing BSM outside of a power boundary in a data processing system, so the failed BSM can be removed, replaced, or tested in place while the data processing system is using the remaining operational BSMs of main storage.
12. To permit the addition of one or more BSMs to the main storage of a data processing system without interrupting the operational state of the system other than for a momentary idling of the storage control for microprogram loading of selected entries in a main storage configuration table.
13. To permit a plurality of predetermined main storage configuration arrangements to be stored in a microprogram accessible medium, such as on a console controlled disk file, which may be selected under microprogram control to provide the most efficient main storage configuration under varying circumstances, such as: failures of different BSM sections, addition of new BSMs into main storage, and changing the interleaving access pattern in main storage.
14. To permit automatic reconfiguration of main storage under diagnostic microprogram control without requiring human intervention by program diagnosing the location of storage failure and automatically reconfiguring main storage by loading a selected data source into a main storage configuration table.

The invention is located in a storage control part of a data processing system, which may be a multi-processing system, to control all accesses to the main storage of the system. The main storage is comprised of any number of basic storage modules (BSMs) which may be equal in size. Each BSM is logically divided into an integral number of sections which is a power of 2.

All storage accesses are requested by means of a storage command to the storage controller from any processor in the system, including from any main processor, any I/O channel processor, and any console service processor. The storage control determines the priority of, and provides temporary storage for, contending storage commands.

This invention receives each storage request command into a processor input register (PIR), when the command is given priority to access storage. The command contains the absolute address of the storage request, wherein dynamic address translation and prefixing may have previously been done on the request. Also received with each command in PIR is an authorization signal indicating whether the request is permitted to access any restricted system area (SA) which may be configured into the BSMs comprising main storage. The requesting processor determines the state of the setting of the authorization signal in PIR.

A storage configuration table (BCA) has a plurality of registers (i.e. entries). A single BCA register is selected by a particular absolute address value in PIR.

The location address (i.e. index) for a required entry in the BCA is generated by a BCA indexing means, which concatenates a highest-order field with a lower-order field, received from different parts of the absolute address currently in PIR. The highest-order field is defined as a contiguous sequence of H number of absolute address bits, in which this field's lowest-order bit is the Mth bit in the absolute address, where $2^M$ equals the size of each BSM in access units, e.g. bytes. The total number H of bits in the highest-order field determines a maximum number $2^H$ of BSMs selectable by this BCA in the data processing system.

The concatenated lower-order field may be one of plural lower-order fields selected from the absolute address in PIR under control of an interleave mode trigger. Each selectable lower-order field is a sequence of R number of bits in the absolute address, in which the lower-order field's lowest-order bit position is the Nth bit in the absolute address. Bit positions M and N in the absolute address are located in its sequence of bits by counting bit positions from its lowest-order bit position (i.e. right-most bit position which is at its 0 bit position.)

The lower-order field's total bit number R determines the number $2^R$ of equal sections into which each BSM is logically divided.

The location N of the lower-order field determines the interleave factor $2^N$, which is the size of each contiguous block of absolute addresses which must be accessed from the same BSM section. Different $2^N$ blocks may be located in different BSM sections, which may be in different BSMs. Interleaving is done by accessing different BSM sections when the absolute addresses cross $2^N$ address boundaries.

Thus, more than one lower-order field may be predetermined for plural different interleave modes, in which each lower-order field has a different location N. For example, if N is 11, interleaving is on 2048 byte (2 KB) boundaries. But when $2^N$ equals the size of each BSM section, interleaving is on BSM section boundaries, which is not considered interleaving because the BCA is prearranged for switching on BSM section boundaries independently of the operation of the lower-order field operation. Accordingly, the interleave mode trigger may select between this "non-interleave" mode and an interleave mode in which the $2^N$ block size is smaller than a BSM section to obtain the most effective interleave operation. Accordingly, in the non-interleave mode, the physical sequence of locations in each BSM section is the same as the sequence of absolute addresses mapped into the respective BSM section. In the interleave mode, a continuous sequence of absolute addresses will switch to a different BSM section each time a $2^N$ block boundary is crossed.

The content of each operational BCA entry is loaded with plural fields of signals which select an assigned BSM section. The plural fields may include: (1) a field assigning one of plural ports connected to any BSM controller, (2) a field assigning a BSM connectable to the assigned port, (3) a field to assign any section in the assigned BSM either directly or indirectly, and (4) a restricted system area (SA) range select field to assign an SA to the assigned BSM section and specify the size of the SA.

The section assignment field may indirectly select the BSM section by modifying a BSM select field taken from the absolute address at its lower-order field described above for non-interleaved operation in which $2^N$ equals the size of each BSM section. The indirect choice is preferred because it does not require modification of the section assignment field for non-interleave mode operation. For interleaved mode, the R number of bits in the lower-order field are arithmetically combined with R number of bits in the section assignment field to generate the BSM section address.

The SA assignment field indicates: (1) whether or not the respective BSM section contains a restricted system area, and if so (2) the size of the SA. The preferred intended use for the SA is for microprogram controlled storage accesses. Accesses to the SA are under control of an authorization field in PIR which can prohibit the accessing of any requested address in the SA if no authorization is signalled by the PIR. The processor sending the storage request command determines the setting of the authorization field.

A required BCA entry is fetched under control of the BCA indexing circuits for selecting the port, BSM, BSM section and SA, if any, assigned to the indexed BCA. The port select and BSM select fields in the fetched BCA entry are forwarded to port and BSM select circuits in the storage control, which activate a port and a BSM select line to a BSM controller. The entries section assignment field is sent to BSM section select circuits, and the SA assignment field is sent to SA access check circuits.

The section select circuits provide a BSM section address component in a BSM physical location address, which is sent by the selected port to the connected BSM controller which selects the required physical location in the selected section of that BSM. The BSM section address component is at the high-order end of the BSM physical location address sent to the selected BSM.

For non-interleaved addressing, the received lower-order field is directly outputted without modification by the section select circuits by having the section assignment field in the selected BCA entry set to zero so it will not affect the section selection. The section assignment field in the BCA entry can be easily changed to a non-zero modifier field for selecting any other section in the BSM. The BCA section modifier field is arithmetically combined (e.g. Exclusive-ORed) with the received PIR field to generate the section address outputted by the section select circuits.

The SA range select field in the selected BCA entry is forwarded to SA access check circuits, which determine if the related BSM section has any SA, and if so, checks the location of the SA in the related BSM section and compares the SA size with the absolute address to determine if the absolute address is within the SA, and then inhibits the access to the SA unless permitted by the authorization field in PIR. The SA range select field may have two parts: (1) a bit indicating if the related BCA entry has any SA, and (2) Z number of bits indicating the size of the SA. If no separate existence bit is provided in the field, one of the size values would be needed to indicate the existence of an SA. The size of the SA is variable in any multiple of a predetermined incremental unit, which is an integral power of 2, e.g. 32 KB. The Z number of bits can be combinatorially varied to indicate the SA size over a range from one incremental unit (e.g. 32 KB) up to a permitted maximum size for the SA (e.g. up to 16 incremental units providing 524 KB).

In the SA check circuits, an SA location check circuit determines if the absolute address in the PIR is located within the BSM fraction predetermined to contain the SA. The BSM fraction is equal to BSM size/S, which cannot be greater than a BSM section. The location of the BSM fraction in the BSM is predetermined, e.g. BSM fraction assigned to the highest absolute address. The SA location check circuit recognizes when the absolute address is within the predetermined BSM fraction by having the circuit recognizing a particular state for the absolute address when it is within the predetermined BSM fraction. This is done by examining a particular field in PIR having F number of contiguous bits with its lowest-order bit being the Gth bit in the absolute address, so that $2^F$ equals S and $2^G$ equals the size of the BSM fraction. The combinatorial value of this field in the absolute address can vary from all zeros (indicating the absolute address is in the BSM fraction at the beginning of the BSM) to all ones (indicating the absolute address is in the BSM fraction at the end of the BSM). The latter is chosen in the detailed embodiment described herein to specify a BSM fraction located at the end of the BSM, wherein an SA location AND circuit is activated by the F bits when they are all ones.

The SA check circuits not only recognize when the absolute address in PIR is within the predetermined BSM fraction, but also recognize when the absolute address is within the specified SA size. The SA is defined in relation to the predetermined BSM fraction, e.g. to include the highest absolute addresses mapped into the BSM fraction. For the latter case, the SA check circuits determine if the absolute address in PIR exceeds the SA lower boundary (and therefore falls within the specified SA size) by comparing the selected SA size field with a size check field taken from the absolute address in PIR. The size check field's lowest-order bit is the Cth bit in the absolute address wherein $2^C$ is equal to the SA incremental unit, (e.g. C is 15 for a 32 KB incremental unit).

The size comparison, along with the other checks, determine if the absolute address is within the SA or not. Authority control is applied to refuse access only if the address is within the SA.

These and other objects, features and advantages of the invention may be more fully understood and appreciated by considering the following detailed description in association with the accompanying drawings.

DESCRIPTION OF THE DRAWINGS

In the accompanying drawings forming a material part of this disclosure:

FIGS. 6, 7 and 8 illustrate different exemplary configurations for data processing systems which may use this invention for controlling their main storage configurations.

FIG. 9 illustrates a data path to a selected BSM within any of the data processing systems illustrated in FIGS. 6, 7 or 8.

FIG. 10A represents interface lines for one of the ports between a system storage controller (SC) and a BSM controller (BSE).

FIG. 10B represents interface lines between any processor and a system storage controller (SC) for communicating processor storage request commands to the controller.

FIGS. 11A and 11B show data paths in a BSM controller (BSE).

DESCRIPTION OF A DETAILED EMBODIMENT

Figure 6:
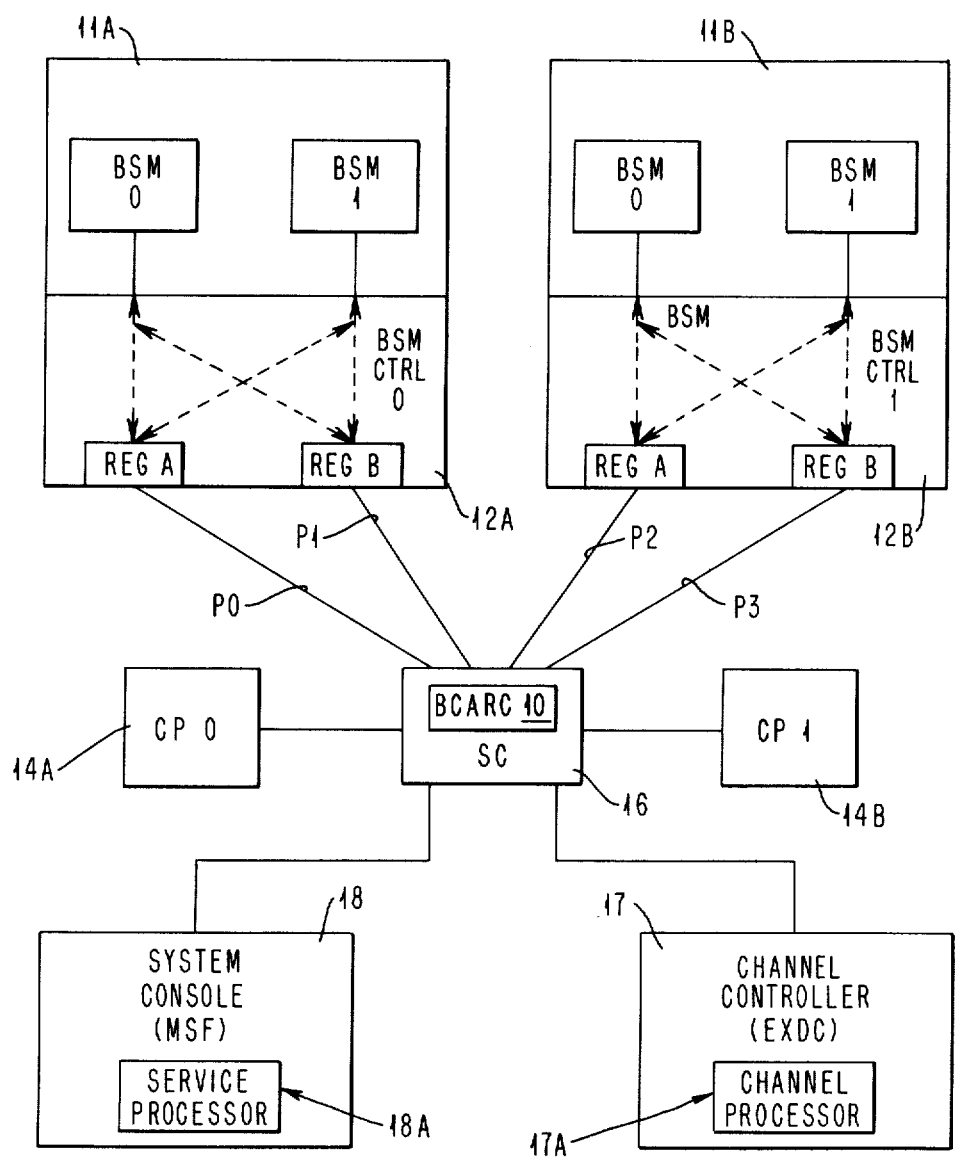

FIGS. 6, 7 and 8 represent different main storage configurations in data processing systems which contain the subject invention. This invention will handle the changes in the main storage configuration relationship to a system storage controller (SC) when the main storage is changed from that shown in FIG. 6 to FIG. 7 to FIG. 8, etc., or vice versa.

FIGS. 6, 7 and 8 each have a system central storage (i.e. main system storage) comprised of a plurality of BSMs (basic storage modules) packaged in pairs. Each BSM has a capacity for storing up to four megabytes (MS). The packaging of BSM pairs with a single BSM controller is done in a single unit (see FIG. 9) called a basic system element (BSE). FIG 6 shows two BSEs 11A and 11B each having two BSMs identified as BSM's 0 and 1. Each BSE has a BSM controller 12A or 12B.

In FIGS. 6, 7 and 8, each BSE is connected to two ports in the system which may be derived from the same or different SCs in the system. In FIG. 6, the ports are all provided from the single SC 16 in the system. In FIGS. 7 and 8 the ports to each BSE are derived from different SCs.

Figure 11B:
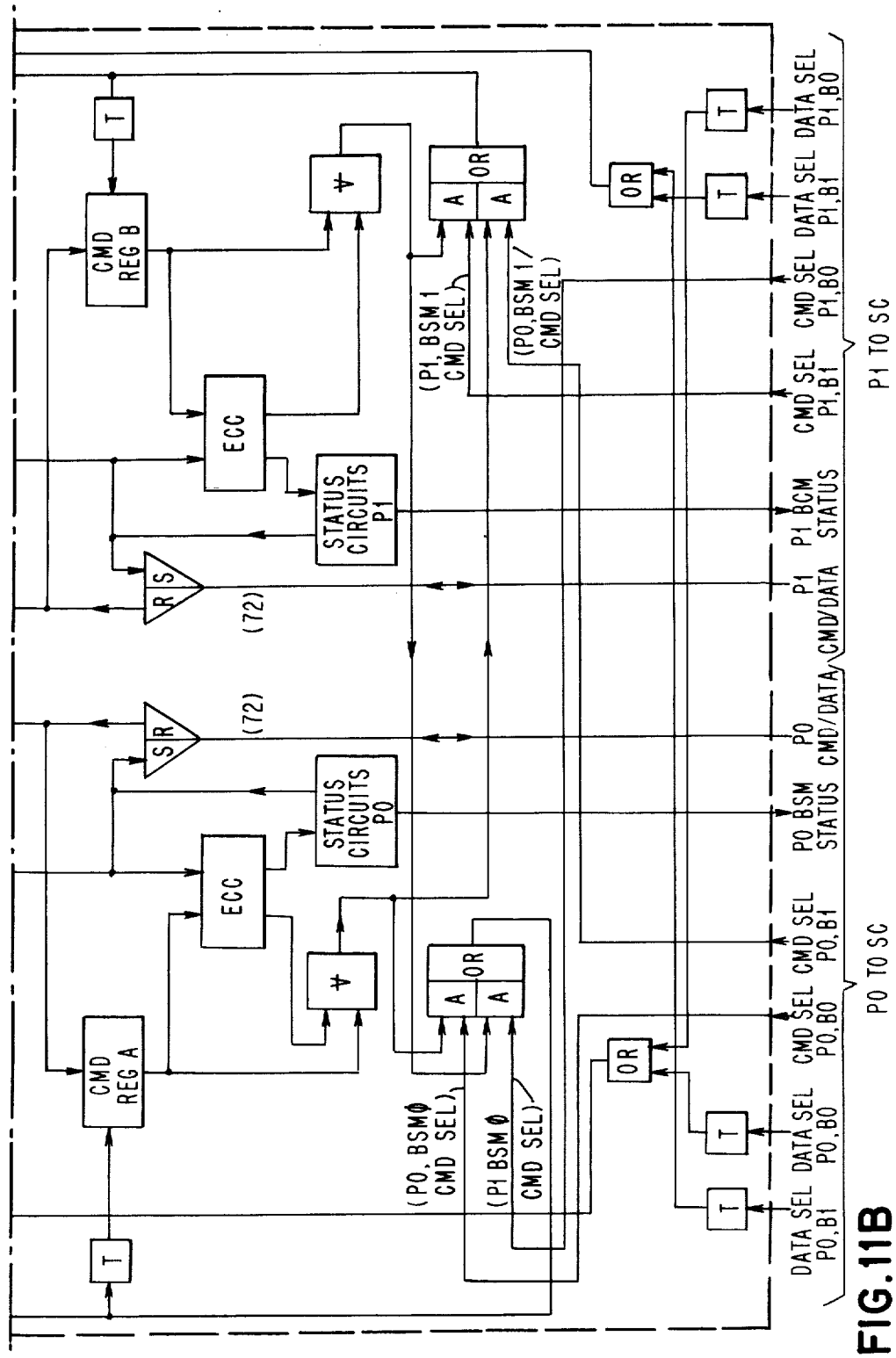
Figure 12:
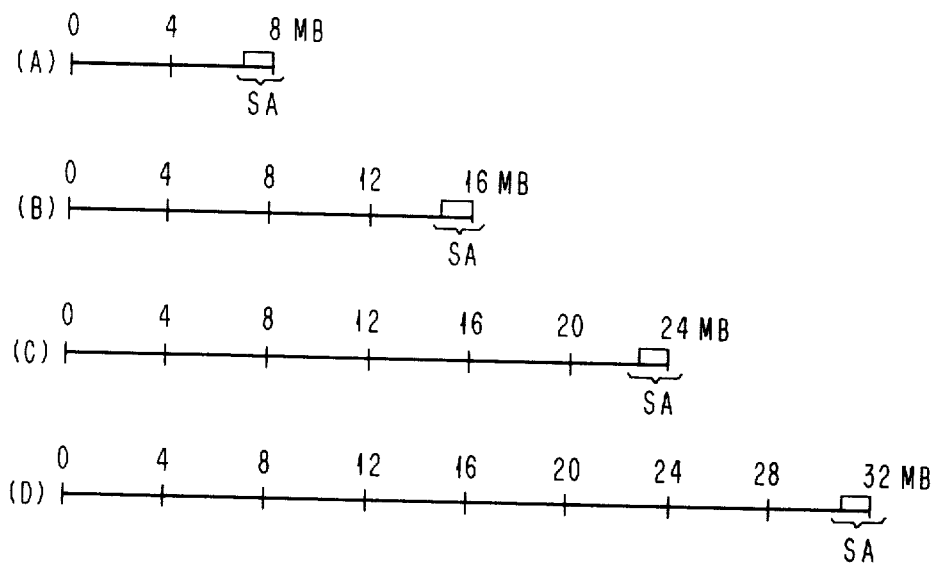
FIG. 12 shows examples of the locations of a restricted system area (SA) in each of four different absolute address ranges corresponding to four different configurations of system main storage.

Each BSM controller can connect each of its two BSMs to either of its two ports by connecting them to the ports in either direct or reverse order. The detailed logical structure witin a BSM controller is shown in FIGS. 11A and 11B. Thus, in FIGS. 7 and 8, either SC can be connected to any BSM in the system.

In FIGS. 6 and 8, each SC is connected to two central processors (CPs), while in FIG. 7, each SC is connected to only one CP. Each SC is also connected to a system console and to a channel controller which may control dozens of I/O device subchannels. If there are two SCs in the system as in FIGS. 7 and 8, each SC is also connected to the other SC.

Each SC transfers data between the central storage and each connected processor, which includes its connected CPs, a channel controller processor 17A, and a system console processor 18A. In FIGS. 7 and 8 where two SC are connected together, either SC can also transfer data between its remote SC's processors and central storage if either SC paths to storage should have a failure.

Each SC can simultaneously support two separate communication paths in opposite directions with respect to central storage. A single communication path through any port in the embodiments disclosed herein provides for the parallel transfer of a double word (64 bits) accessed in central storage and its error correction code (ECC) comprising 8 bits. Each port comprises control lines, 72 data/command communication ECC lines. The data/command lines carry command signals at one time and data signals at another time, according to signals on the control lines. FIG. 10A illustrates all of the lines in one port. FIG. 10B illustrates the connections from the SC to one processor.

A BSM configuration and address range control (BSARC) 20 is an entity designed into each SC to implement the subject invention. Each BSARC 10 defines a current configuration of central storage and how it is accessed in relation to absolute address received by any SC from a processor. Each BSARC 10 determines which SC port is connectable to which BSM in central storage. BSARC 10 also determines the size and location of BSM sections. The sequence of absolute addresses assigned to each BSM section is reassignable as a unit to any other BSM section. This BSM section reassignability is used for interleaving control assignments, and for diagnostic partitioning reassignment upon section failure. Furthermore, BSARC 10 can fence off a defined area, called a restricted system area (SA), within any BSM section to be accessible only to processor microprograms, and inaccessible to all machine instructions available to normal machine users.

Thus, the system configuration and accessibility control obtainable by this invention is highly flexible. Central storage may contain as few as one BSE or as many as four BSEs, comprising from one to eight BSMs, selectable by any one or two SCs. Each SC will have at least one port to each BSE, and therefore each SC has at least one path to every BSM in central storage. Each SC is directly connected to one or two CPs and at least one channel controller, and to any other SC which may exist in the system. Also, the SC is connected to the system console, which may be shared by the SCs. A primary purpose of the SC is to control all data transfers with central storage which are initiated by its connected entities, e.g. CP, channel controller, console, and another SC (if any).

FIG. 9 shows a cross-section of system operation in relation to a selected port. The port is selected by the value of the absolute address in a storage request command provided from any processor connected to the SC receiving the request. "Processor" is used here in the loose sense of referring to any entity connected to the SC which can store or fetch data and/or instructions in central storage, e.g. central processors (CPs), channel processor (EXDC), console service processor (MSF) and any remote SC. The console has a service processor 18A, and the channel controller has a channel processor 17A.

In FIG. 9, all processors connected to a SC send their storage request commands to a request priority and queuing control 101 within the SC. Control 101 is described and claimed in U.S.A. patent application having Ser. No. 840,070; Filed on Oct. 6, 1977 by E. J. Annunziata et al, entitled "Backing Store Access Coordination In A Multiprocessing System", now U.S. Pat. No. 4,136,386 and assigned to the same assignee as this application.

The absolute address with each storage request given priority by control 101 is sent to a Processor Input Register (PIR) 20; the request command may have been buffered in a queue in control 101. The BSM configuration and Address Range Control (BSARC) 10 receives inputs from PIR 20 and determines the selection of a port to a BSE and the selection of the BSM in the BSE. The selected port and BSM are represented in FIG. 9. The selection operation by BSARC 10 is done in parallel with the transfer of the request address from PIR 20 to a storage input register (SIR) 24.

The command in SIR 24 is transferred by the selected port to the selected BSM to access the location of the required data in the selected BSM. The command information (including identification RQID of the command and the address of the data in the selected BSM is received by a connected command register A, e.g. CMD REG A shown in FIG. 9 in the selected BSM controller, which thereafter accesses the requested location in the BSM. The BSM is shown structured on a circuit board containing a plurality of LSI storage array cards and control cards.

Normally, data is transferred by the port as a sequence of double words, e.g. a cache line having 16 DWs, or a channel group having from one to eight DWs. If the command is a store command, each DW of data is transferred by the port as 64 data bits and 8 ECC bits in parallel into or from a data register A, from which each DW is transferred to or from either an odd register A or an even register A according to whether the double word (DW) has an odd or even DW address in the BSM. For store commands, the contents of the odd and even registers are outputted alternately to odd and even BSM registers, which store the two DWs in parallel. Fetch commands await the accessing of the requested pairs of DWs from the BSM board into the BSM registers from which the two DWs are transferred alternately to the odd and even registers in the BSM controller.

Thus, two DWs can be accessed in parallel within the BSM even though they sequentially transfer to or from the odd and even registers, each DW having a 50 nanosecond (NS) access time. The gating operation of the odd and even registers is staggered, so that they maintain the sequence of DWs being sequentially accessed in the BSM for a cache line store or fetch, for example. Therefore, the DW transfers are staggered between data register A and the odd and even registers at the rate of one DW every 25 NS. Hence, a 16 DW cache line access can occurs in 425 NS.

Figure 1:
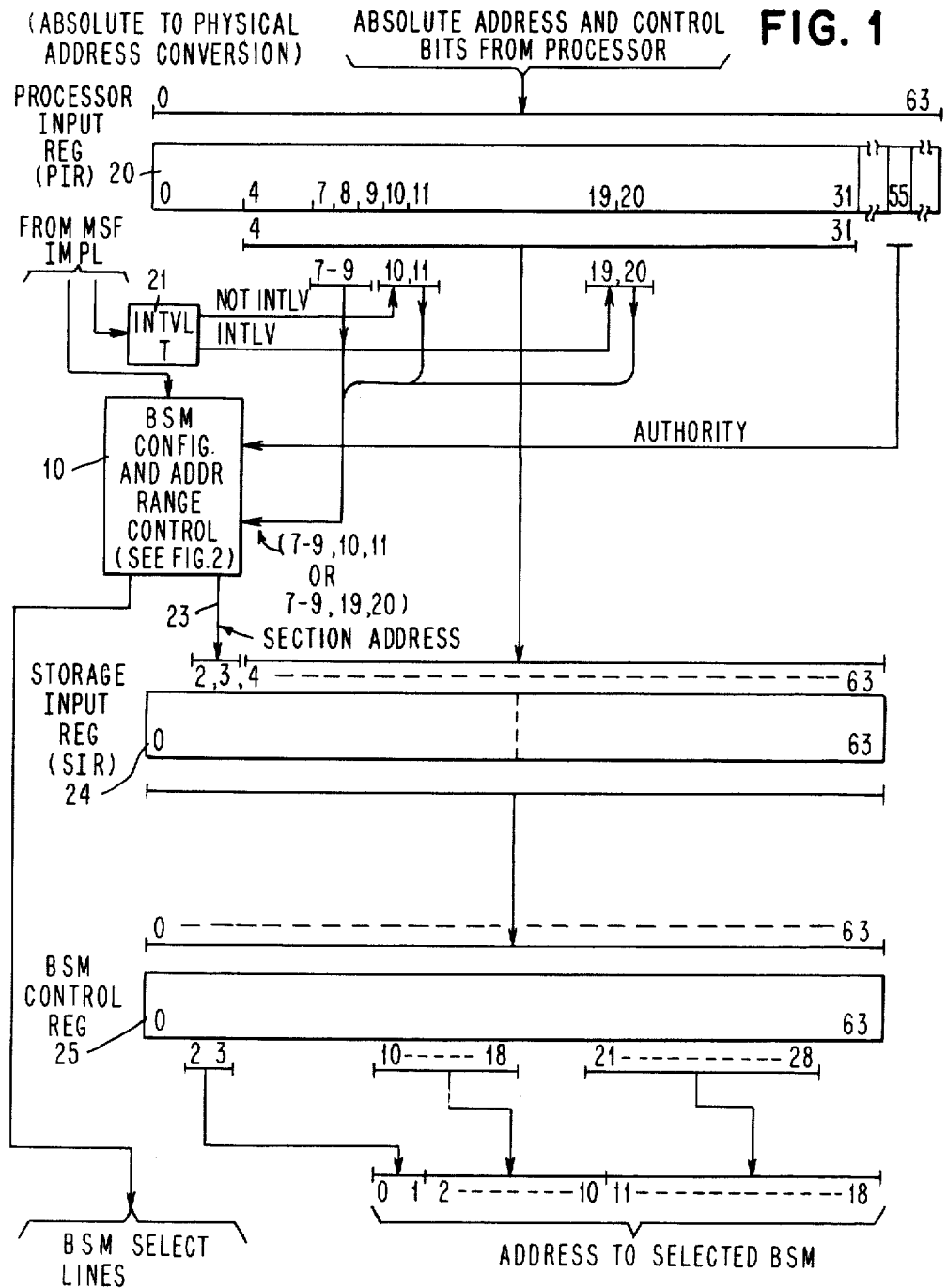
FIG. 1 illustrates a function performed by the invention of converting absolute addresses into BSM selection and BSM physical addresses in a storage control for a data processing system.

FIG. 1 shows a more detailed diagram of how BSARC 10 is connected to PIR 20 and SIR 24. PIR 20 has bit positions 0–63, which receive a storage command derived from a processor. Command bits 0–31 contain an absolute address, and the other bits provide other command information, e.g. fetch bit, store bit, microcode fetch bit, etc. including authorization bit 55 which indicates the authority for the request, i.e. if set to 0 the request is prohibited from accessing a restricted system area, if any, in the selected BSM.

The BSM's are all accessed in an interleaved or non-interleaved manner, which is determined by the setting of an interleave trigger 21. Interleaving in this embodiment is done on physical block boundaries of 2048 bytes, and non-interleaving is done on BSM section boundaries, e.g. 1,048,576 bytes (1 MB) per section. BSM sections are used as the configuration units of central storage.

The state of interleave trigger 21 is set from the system console (MSF) when the system is being initially microprogram loaded (IMPL).

The BSM configuration and address range control (BSARC) 10 determines the BSM section in central storage where the data resides for each requested absolute address. Each BSM is divided into four equal 1 MB sections. BSARC 10 outputs a two bit BSM section select signal into bit positions 2 and 3 of SIR 24. Address bits and command bits are transferred from PIR 20 to bit positions 4–63 in SIR 24, which then transfers its content to a BSM control register 24 in which is formed the physical BSM address transferred to the port in the form required to access the required data in the selected BSM.

Figure 2:
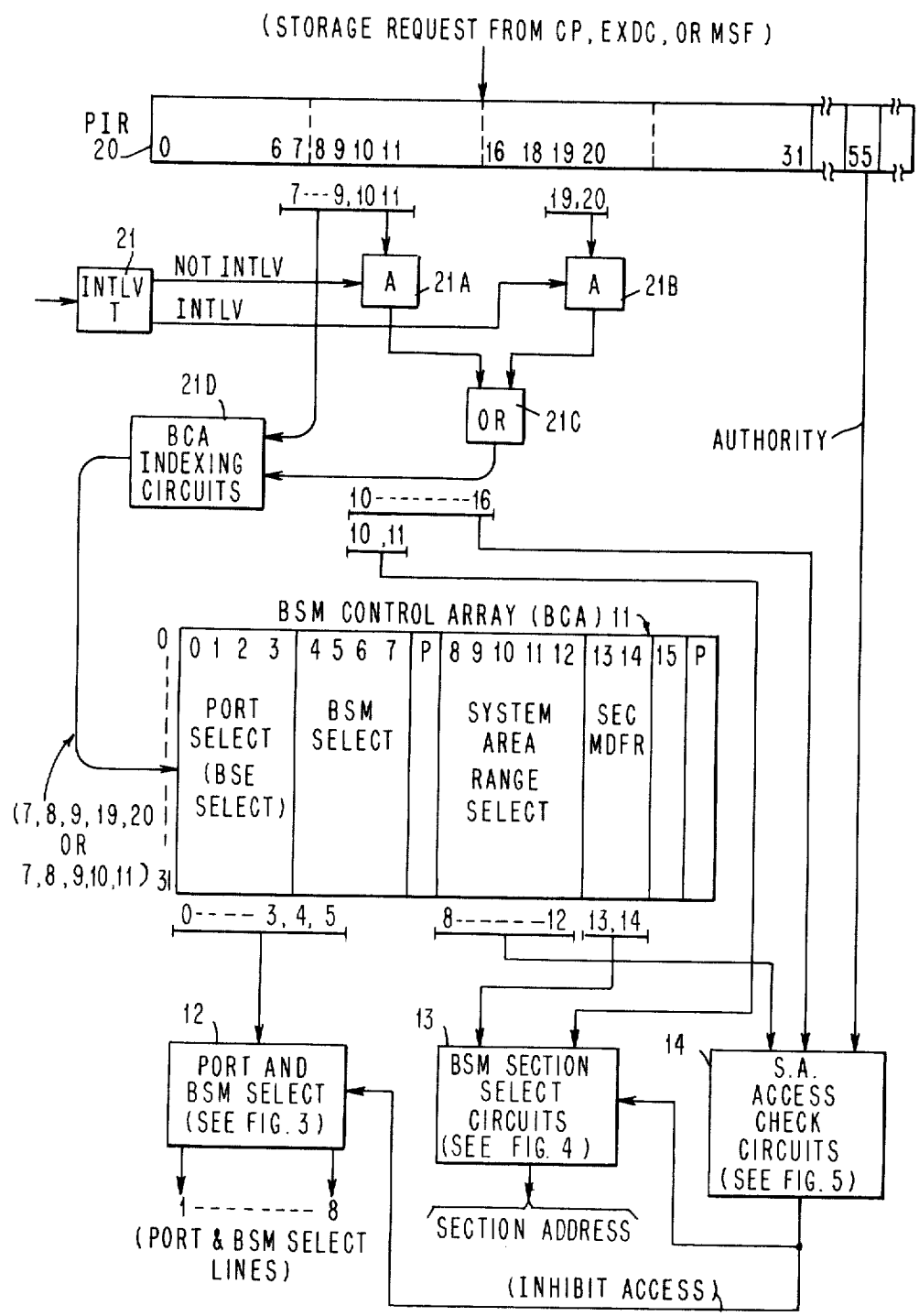
FIG. 2 represents a preferred embodiment of a BSM configuration and address range control (BSARC) using this invention.

BSARC 10 and its input and output circuits are shown in detail in FIG. 2 and include a writeable storage array having fast access characteristics, designated as the BSM control array (BCA) 10A, which contains the assignments of absolute addresses to all BSM sections in central storage to provide the operational configuration for central storage. The BCA 10A has 32 register entries (indexed 0–31) to receive assignments for up to 32 BSM sections, which comprise all the sections in up to eight BSMs. The number of entries can be made smaller or larger to accommodate any maximum central storage size, involving any number of BSMs and any number of sections per BSM.

The BCA entries are loaded with codes on initialization of the data processing system. Each BCA entry controls the assignment of a one megabyte (1 MB) range of absolute addresses to any one megabyte section in any BSM. Therefore, four of the one MB ranges of absolute addresses may be physically mapped into each BSM as long as all four sections in the BSM are operational. If any one or more sections in a BSM are not operational, their use can easily be avoided with this invention by not loading their port, BSM and section address codes into any BCA entry.

Thus, in this embodiment, the central storage (CS) may be configured with each 1 MB set of absolute addresses (beginning on each 1 MB storage boundary) being physically assigned to every operational section in every BSM connected to the system controller. Hence, any one or more of BSM sections which are not reliable need not be used, or any section which later fails can easily be reconfigured out of CS whenever it becomes unreliable. Furthermore, an entire BSM can be configured out in order to replace it without disturbing the operation of the system.

Each BCA entry 0–31 in array 10A has a port assignment field (4 bits), BSM assignment field (4 bits), system area assignment field (5 bits), and a section modifier field (2 bits). A total of 15 control bits and two parity bits (P) are provided in each BCA entry. One of the four bits in the port assignment field 0–3 is set with a one bit to assign a port for that entry, which determines the selection of a BSE. One of the BSM assignment fields bits 4 or 5 is set to a one bit to select one of the two BSMs in the selected BSE determined by the port assignment. Bit position 4 selects BSM 0 and bit position 5 selects BSM 1 in the selected BSE. Bit positions 6 and 7 are not used in this embodiment, but allow for replacement of BSEs with new BSEs that can contain up to four BSMs.

The BCA entries 0–31 are selected by absolute address bits 7 through 11 for non-interleave mode, or 7 through 10, 19, 20 for interleave mode.

In non-interleave mode, each BCA entry is used for accessing a contiguous 1 MB absolute address range, since the entry-selecting absolute address bits (10,11) are used.

In interleave mode, entry-selecting absolute address bits 19, 20 are used, which cause a different BCA entry to be selected each time the sequence of absolute addresses crosses a 2 K boundary, which occurs whenever absolute address bits 19 or 20 change. A sequence of four BCA entries will be selected when sequencing through all absolute addresses within adjacent 4 MB BSM boundaries (during which there is no change in the setting of BCA index bits 7, 8, 9). Thus, there is modulo 4 operation of absolute address bits 19 and 20 in the interleaved mode. The four selected BCA entries may be loaded to select four BCA sections in: (1) four different for 4-way interleaving, or (2) in two different BSMs for 2-way interleaving, or (3) in one BSM for only BSM section interleaving. It is also possible to load the four BCA entries so that two of the BCA sections are in first and second BSMs and the remaining two BCA sections are in a third BSM to provide 3-way BSM interleaving.

Figure 4:
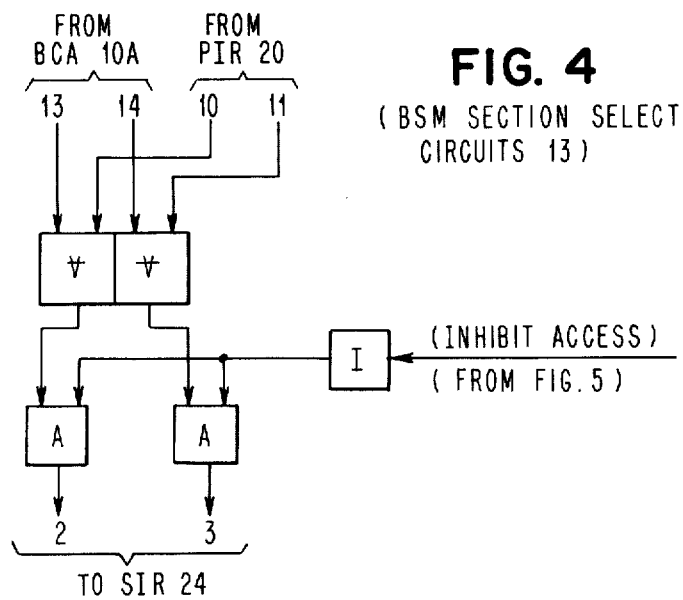
FIG. 4 is a detailed embodiment of BSM section select circuits.

The BSM section select circuits are shown in FIG. 4. They receive the section modifier bits 13 and 14 in each selected BCA entry to Exclusive-OR them with absolute address bits 10, 11 which is the lower-order field defining BSM section boundaries in the sequence of absolute addresses. Variation of the section modifier bits will cause the 1 MB of absolute addresses which index to a particular BCA entry to access a different BSM section. Without the section modifier bits, the absolute address which indexes to a particular BCA entry could only be associated with the one BSM section determined by absolute address bits 10, 11. Use of the section modifier bits permits any of the other three BSM sections to be used for any sequence of absolute addresses. This provides total flexibility in section assignment.

An important use of the section modifier field is to enable the removal, upon failure, of any BSM section by reassigning its 1 MB range of absolute addresses to any other available section in the same or a different BSM in central storage. This is done by changing the section modifier field in that BCA entry to select another section in the same BSM, and/or to select another BSM by changing the BSM select field and/or the port select field. Section removal may require the overall absolute address range mapped into central storage to be reduced by a 1 MB amount per section removed. This involves eliminating one operational BCA entry for each section removed by reloading the respective entries. This permits easy reconfiguration of central storage whenever a failure is recognized in any BSM section by merely reloading the BCA entries with another set of values.

The system area range select field in BCA bit positions 8–12 can specify a restricted storage area (SA) within any BSM section specified by any BCA entry. The system area theoretically could be defined to be anywhere in the BSM section. The architectural convention chosen for this embodiment is that the SA will be located only at the high address end of the BSM section, and that the size of the SA will be variable in 32 kilobyte (KB) increments up to a maximum size of 524 KB. The chosen convention also specifies that only one SA will exist in central storage. This convention (or any other convention) is enforced by the state of the bits in the SA range select field. The state of bit 8 indicates if any SA exists in the BSM section specified by that entry. The combinatorial state of bits 9–12 specify the size of the SA in from one to 16 incremental units of 32 KB per unit. Thus, bit 8 is set to one to indicate the existence of an SA in only one entry in the BCA; and bit 8 is set to zero in all other entries in accordance with this convention. In the one entry having bit 8 set to one, bits 9–12 are set to indicate an SA size of from one to 16 incremental units. For example, an all zero SA size code indicates a 32 KB system area at the end of the respective BSM section. An all-ones SA size code indicates the maximum 524 KB SA size at the end of the BSM section.

The SA is used to define a storage area which is accessible only to processors for system activities such as: microprograms and interrupt queues, microprogram control blocks, and tables manipulated by microprograms, which should not be accessible to normal system users. Accordingly, the SA is not available to the machine instruction sets used in the problem state and supervisory state of a processor. The SA is only accessed when the processor is in a special SA state, such as when it is doing a special microprogram function. Each processor determines and communicates the SA access authority with each storage request command by the state of bit 55 in the command sent to PIR 20. Thus, PIR bit 55 indicates to the SC whether authority has been provided to access the SA, and a processor providing SA authority will provide an absolute address within the SA. If a processor command provides an absolute address without providing SA access authority, the access is not permitted.

The flexibility provided by this invention permits the SA to be located anywhere in the operational absolute address range of central storage. However, the chosen convention also requires that the SA shall be mapped into the highest available absolute addresses useable in central storage. This requires that the single BSM section containing the SA will be specified by the largest-index operational BCA entry. In FIG. 2, that operational entry is the one nearest to the bottom of the BCA.

FIGS. 12(A) through 12(D) represent varying sizes of central storage from 8 MB to 32 MB of absolute address range, in which these conventions are applied.

In the preferred embodiment, the BCA is structured on a storage-array chip having a very high fetch speed. A small but fast BCA chip can support a large central storage configuration. For example, a BCA chip with 32 register entries having only eighteen bit positions per entry can control up to 32 MB of absolute addresses mapped into 32 1 MB BSM sections. The number of entries designed in the BCA is determined by the number of BSM sections in the maximum configurable main storage arrangement.

The efficient and flexible storage mapping obtained by the BCA operation does not interefere with the data access rate of the system processors to central storage, because the BCA operates in parallel with other required storage accessing operations which control the storage access time.

In FIG. 2, the BCA index is derived by concatenating PIR bits 7, 8, 9 (the highest-order field which changes on BSM absolute address boundaries) and either PIR bits 10, 11 (the lower-order field which changes on BSM section boundaries) or PIR bits 19, 20 (the lower-order field which changes on 2KB boundaries), depending on whether interleave trigger 21 is set to non-interleave or interleave mode respectively. The concatenating is done in BCA indexing circuits 21D to generate the BCA index addresses.

Interleaving permits relatively closely spaced addresses in a sequence of absolute addresses to be accessed in different BSMs to support simultaneous accessing in plural BSMs during system execution of one or concurrent plural programs. Such parallel BSM operation increases overall system performance. Because of the modulo-4 type of operation by absolute address bits 19 and 20, 0-way, 2-way, 3-way or 4-way interleaving can be determined by the way the BCA port select, BSM select, and section modifier fields are written into the BCA entries. No BSM interleaving occurs when the same BSM is addressed during consecutive 2KB boundary crossings, however, BSM section interleaving can still occur by selecting different sections in the same BSM. Two-way BSM interleaving involves alternately addressing two different BSMs (generally in the same BSE) during consecutive 2KB boundary crossings in an absolute address sequence. 4-way interleaving involves addressing four different BSMs (preferably in two BSEs although they may be in up to four BSEs).

Hence, the BSMs selected during interleaving, and the degree of interleaving (e.g. 2-way or 4-way) are determined by the codes written into the BCA entries. These codes can be loaded into the BCA entries by a console service processor 18A in FIG. 6, whenever console service processor 18A reconfigures central storage.

The following TABLES 2 and 3 respectively provide examples of how BCA 10A may be loaded for 2-way and 4-way interleaved control storage operation.

TABLE 2

2-Way Interleave BCA Set-up

| BCA ADDRESS | | | | | ABS ADDR #MB | BSM I.D. | PORT | | | | BSM | | | SA CODE | | | | | SEC MOD. | |
|---|---|---|---|---|---|---|---|---|---|---|---|---|---|---|---|---|---|---|---|---|
| HI | | | LO | | | | | | | | | | | | | | | | | |
| 7 | 8 | 9 | 19 | 20 | | | 0 | 1 | 2 | 3 | 6 | 7 | 4 | 5 | 8 | 9 | 10 | 11 | 12 | 13 | 14 |
| 0 | 0 | 0 | 0 | 0 | 0 | 0 | 0 | 0 | 0 | 1 | 0 | 0 | 0 | 1 | 0 | 0 | 0 | 0 | 0 | 0 | 0 |
| 0 | 0 | 0 | 0 | 1 | 1 | 1 | 0 | 0 | 0 | 1 | 0 | 0 | 1 | 0 | 0 | 0 | 0 | 0 | 0 | 0 | 0 |
| 0 | 0 | 0 | 1 | 0 | 2 | 0 | 0 | 0 | 0 | 1 | 0 | 0 | 0 | 1 | 0 | 0 | 0 | 0 | 0 | 0 | 0 |
| 0 | 0 | 0 | 1 | 1 | 3 | 1 | 0 | 0 | 0 | 1 | 0 | 0 | 1 | 0 | 0 | 0 | 0 | 0 | 0 | 0 | 0 |
| 0 | 0 | 1 | 0 | 0 | 4 | 0 | 0 | 0 | 0 | 1 | 0 | 0 | 0 | 1 | 0 | 0 | 0 | 0 | 0 | 0 | 0 |
| 0 | 0 | 1 | 0 | 1 | 5 | 1 | 0 | 0 | 0 | 1 | 0 | 0 | 1 | 0 | 0 | 0 | 0 | 0 | 0 | 0 | 0 |
| 0 | 0 | 1 | 1 | 0 | 6 | 0 | 0 | 0 | 0 | 1 | 0 | 0 | 0 | 1 | 0 | 0 | 0 | 0 | 0 | 0 | 0 |
| 0 | 0 | 1 | 1 | 1 | 7 | 1 | 0 | 0 | 0 | 1 | 0 | 0 | 1 | 0 | 1 | 0 | 0 | 0 | 0 | 0 | 0 |

Total System Area = 32KB

Note:
In TABLE 2 the 2-way BSM interleaving is indicated by the alternate settings in the BSM I.D. column.

TABLE 3

4-Way Interleave BCA Set-up

| BCA ADDRESS | | | | | ABS | | | PORT | | | | BSM | | | | SA CODE | | | | SEC. MOD. | |
| --- | --- | --- | --- | --- | --- | --- | --- | --- | --- | --- | --- | --- | --- | --- | --- | --- | --- | --- | --- | --- | --- |
| HI | | | LO | | ADDR | BSM | | | | | | | | | | | | | | | |
| 7 | 8 | 9 | 19 | 20 | #MB | I.D. | 0 | 1 | 2 | 3 | 4 | 5 | 6 | 7 | 8 | 9 | 10 | 11 | 12 | 13 | 14 |
| 0 | 0 | 0 | 0 | 0 | 0 | 0 | 0 | 0 | 0 | 1 | 0 | 1 | 0 | 0 | 0 | 0 | 0 | 0 | 0 | 0 | 0 |
| 0 | 0 | 0 | 0 | 1 | 1 | 1 | 0 | 0 | 1 | 0 | 0 | 1 | 0 | 0 | 0 | 0 | 0 | 0 | 0 | 0 | 0 |
| 0 | 0 | 0 | 1 | 0 | 2 | 2 | 0 | 0 | 0 | 1 | 1 | 0 | 0 | 0 | 0 | 0 | 0 | 0 | 0 | 0 | 0 |
| 0 | 0 | 0 | 1 | 1 | 3 | 3 | 0 | 0 | 1 | 0 | 1 | 0 | 0 | 0 | 0 | 0 | 0 | 0 | 0 | 0 | 0 |
| 0 | 0 | 1 | 0 | 0 | 4 | 0 | 0 | 0 | 0 | 1 | 0 | 1 | 0 | 0 | 0 | 0 | 0 | 0 | 0 | 0 | 0 |
| 0 | 0 | 1 | 0 | 1 | 5 | 1 | 0 | 0 | 1 | 0 | 0 | 1 | 0 | 0 | 0 | 0 | 0 | 0 | 0 | 0 | 0 |
| 0 | 0 | 1 | 1 | 0 | 6 | 2 | 0 | 0 | 0 | 1 | 1 | 0 | 0 | 0 | 0 | 0 | 0 | 0 | 0 | 0 | 0 |
| 0 | 0 | 1 | 1 | 1 | 7 | 3 | 0 | 0 | 1 | 0 | 1 | 0 | 0 | 0 | 0 | 0 | 0 | 0 | 0 | 0 | 0 |
| 0 | 1 | 0 | 0 | 0 | 8 | 0 | 0 | 0 | 0 | 1 | 0 | 1 | 0 | 0 | 0 | 0 | 0 | 0 | 0 | 0 | 0 |
| 0 | 1 | 0 | 0 | 1 | 9 | 1 | 0 | 0 | 1 | 0 | 0 | 1 | 0 | 0 | 0 | 0 | 0 | 0 | 0 | 0 | 0 |
| 0 | 1 | 0 | 1 | 0 | 10 | 2 | 0 | 0 | 0 | 1 | 1 | 0 | 0 | 0 | 0 | 0 | 0 | 0 | 0 | 0 | 0 |
| 0 | 1 | 0 | 1 | 1 | 11 | 3 | 0 | 0 | 1 | 0 | 1 | 0 | 0 | 0 | 0 | 0 | 0 | 0 | 0 | 0 | 0 |
| 0 | 1 | 1 | 0 | 0 | 12 | 0 | 0 | 0 | 0 | 1 | 0 | 1 | 0 | 0 | 0 | 0 | 0 | 0 | 0 | 0 | 0 |
| 0 | 1 | 1 | 0 | 1 | 13 | 1 | 0 | 0 | 1 | 0 | 0 | 1 | 0 | 0 | 0 | 0 | 0 | 0 | 0 | 0 | 0 |
| 0 | 1 | 1 | 1 | 0 | 14 | 2 | 0 | 0 | 0 | 1 | 1 | 0 | 0 | 0 | 0 | 0 | 0 | 0 | 0 | 0 | 0 |
| 0 | 1 | 1 | 1 | 1 | 15 | 3 | 0 | 0 | 1 | 0 | 1 | 0 | 0 | 0 | 1 | 0 | 0 | 0 | 1 | 0 | 0 |

Note:

In TABLE 3 the 4-way BSM interleaving is indicated by the BSM I.S. column.

In more detail in FIG. 2, AND gate 21B selects bits 19, 20 of the absolute address in PIR20 as the low-order part of the BCA index when interleave trigger 21 is set to interleave mode. Gate 21B provides bits 19, 20 through an OR circuit 21C to array indexing circuits 21D, which also receives PIR bits 7, 8, 9. Circuits 21D concatenate PIR bit groups 7, 8, 9 and 19, 20 into the set 7, 8, 9, 19, 20 to generate the index for addressing the BCA 10A during interleave mode. When trigger 21 is set to non-interleave mode, AND gate 21A is enabled to pass PIR bits 10, 11 to circuits 21D which then generates the BCA address from the concatenation of PIR bits 7, 8, 9 with 10, 11.

The five bit index address selects one of the 32 BCA entries and read out its respective fields to a plurality of circuits 12, 13 and 14 which have different functions related to processing the access request command on PIR 20. Circuits 12 activate lines for the selected port and BSM. Circuits 13 generate the section address in the selected BSM. Circuits 14 generate an inhibit access signal as an input to circuits 12 and 13 when the command in PIR 20 indicates by its bit 55 that the command is not authorized to access central storage if the absolute address in PIR 20 is within the system area. Activation of the inhibit access input to circuits 12 and 13 prevents any of their output lines from being activated. If the address in PIR 20 is not to the system area, the access to central storage is permitted regardless of the state of bit 55.

Figure 3:
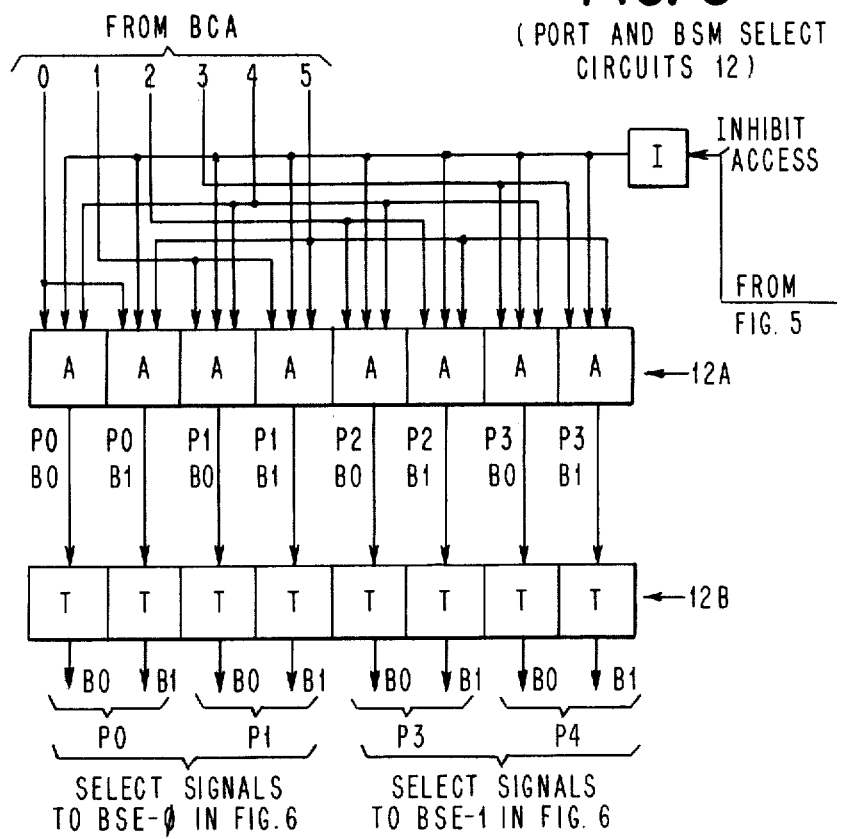
FIG. 3 is a detailed embodiment of port and BSM select circuits.

Circuits 12 are shown in detail in FIG. 3. The AND circuits 12A combine the port select bits 0-3 and BSM select bits 4, 5 to generate the port and BSM select signals (e.g. P0, B0 or P0, B1 for port 0, etc.) by activating up to two of the AND gates 12A and triggers 12B per port. Simultaneous accesses are permitted on ports to different BSMs by having corresponding triggers 12B set simultaneously, even though signals from only one BCA entry is inputted to FIG. 3 at any one time, since commands are accepted in the SC at a higher rate than data can be fetched in any BSM.

FIG. 4 shows in detail the section select modifier circuits 13. When a BCA entry is selected by the index derived from the absolute address in PIR 20, the BSM section represented by that entry may be changed to any section by changing the modifier bits 13, 14 in that BCA entry. Bit positions 10, 11 in the absolute address (which change on 1MB boundaries) normally select the section in the selected BSM. They are directly used by this embodiment when the modifier bits are all zero. If the modifier bits are non-zero, they will modify the section selection in accordance with the operation of the circuit in FIG. 4, which Exclusive-OR's absolute address bits 10, 11 (from PIR 20) with the selected BCA entry modifier bits 13, 14 to output two bits which are inputted into Storage Address Register (SIR) bit positions 2, 3 which is the BSM section address sent to the selected BSM. The BSM containing the selected section is determined by the port and BSM fields in the same BCA entry.

Figure 5:
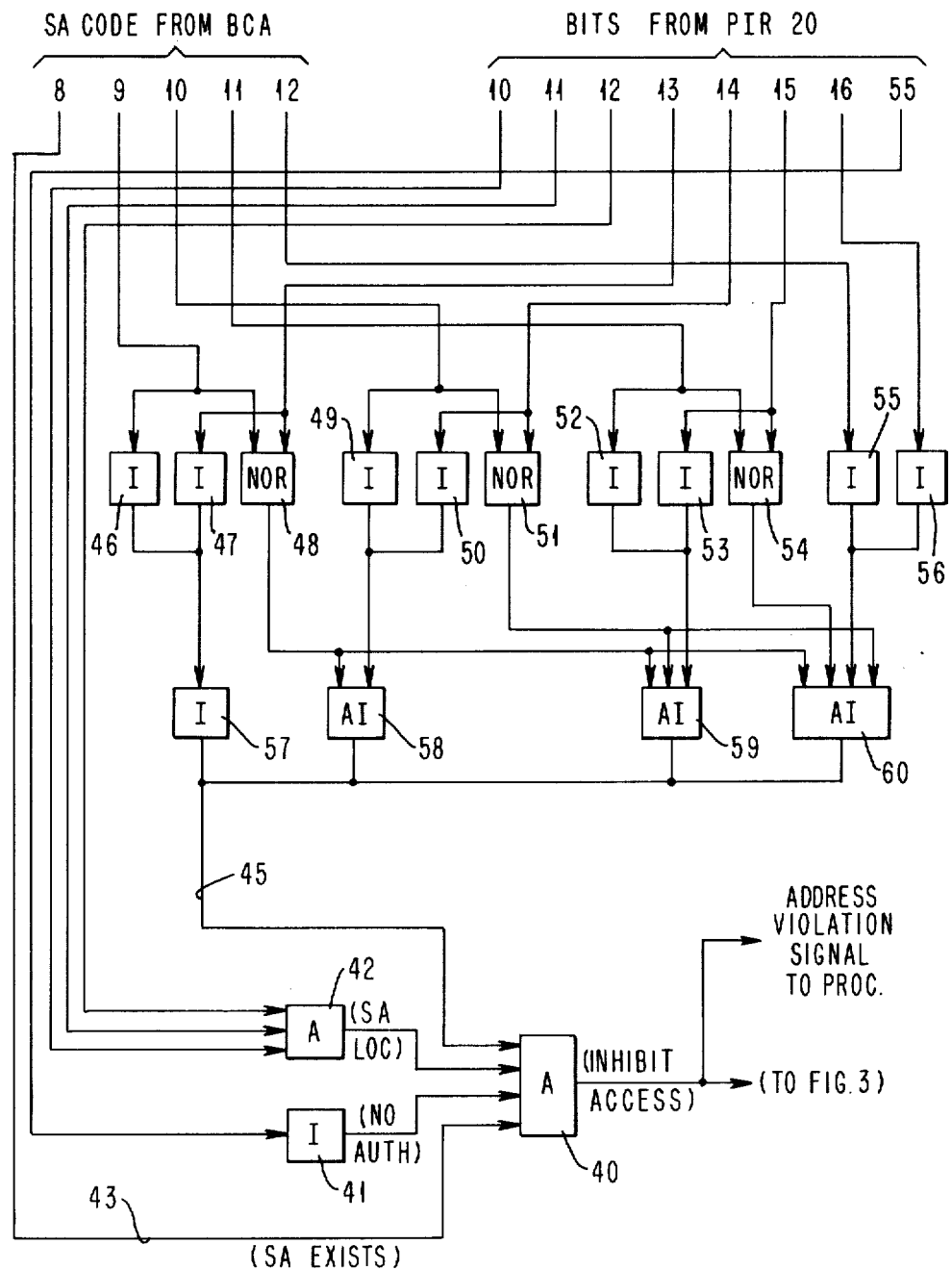
FIG. 5 is a detailed embodiment of system area (SA) access check circuits.

FIG. 5 shows the SA access check circuits 14 in detail. The five bit system area (SA) code in the selected BCA entry's bit positions 8-12 may specify a part of the selected BSM section as a restricted storage area for which special access protection is provided. The SA address range in this embodiment is architecturally limited to be within the last 524KB of the BSM section assigned to the highest absolute addresses for central storage, even though this invention is capable of providing an SA in each BSM section.

The SA address range in a BSM section is settable in multiples of 32KB increments with a 524KB maximum size arbitrarily chosen by an architctural convention as a sufficient SA size. Also by convention, the highest address in the SA is chosen to always end at the upper boundary of BSM section assigned to the highest absolute addresses for central storage. TABLE-1 illustrates this chosen relationship between BCA SA codes and the range selection in the BSM section. In TABLE-1, each X represents 32KB in an SA range horizontally depicted in TABLE-1, and * is a "don't care" bit state:

TABLE 1

| | | | | | | | | | | | | | | | | | | | | |
|---|---|---|---|---|---|---|---|---|---|---|---|---|---|---|---|---|---|---|---|---|
| PIR | 10 | 0 | * | * | 1 | 1 | 1 | 1 | 1 | 1 | 1 | 1 | 1 | 1 | 1 | 1 | 1 | 1 | 1 | 1 |
| ABS. | 11 | * | 0 | * | 1 | 1 | 1 | 1 | 1 | 1 | 1 | 1 | 1 | 1 | 1 | 1 | 1 | 1 | 1 | 1 |
| Addr. | 12 | * | * | 0 | 1 | 1 | 1 | 1 | 1 | 1 | 1 | 1 | 1 | 1 | 1 | 1 | 1 | 1 | 1 | 1 |
| Bits | 13 | * | * | * | 0 | 0 | 0 | 0 | 0 | 0 | 0 | 0 | 1 | 1 | 1 | 1 | 1 | 1 | 1 | 1 |
|  | 14 | * | * | * | 0 | 0 | 0 | 0 | 1 | 1 | 1 | 1 | 0 | 0 | 0 | 0 | 1 | 1 | 1 | 1 |
|  | 15 | * | * | * | 0 | 0 | 1 | 1 | 0 | 0 | 1 | 1 | 0 | 0 | 1 | 1 | 0 | 0 | 1 | 1 |
|  | 16 | * | * | * | 0 | 1 | 0 | 1 | 0 | 1 | 0 | 1 | 0 | 1 | 0 | 1 | 0 | 1 | 0 | 1 |

| BCA System Area Code | | | | | | | | | | | | | | | | | | | Size of SA |
|---|---|---|---|---|---|---|---|---|---|---|---|---|---|---|---|---|---|---|---|
| 8 | 9 | 10 | 11 | 12 | | | | | | | | | | | | | | | |
| 0 | * | * | * | * | → (NO SA IN THIS BSM SECTION) | | | | | | | | | | | | | | |
| 1 | 0 | 0 | 0 | 0 | | | | | | | | | | | | | | X | 32KB |
| 1 | 0 | 0 | 0 | 1 | | | | | | | | | | | | | X | X | 64KB |
| 1 | 0 | 0 | 1 | 0 | | | | | | | | | | | | X | X | X | " |
| 1 | 0 | 0 | 1 | 1 | | | | | | | | | | | X | X | X | X | " |
| 1 | 0 | 1 | 0 | 0 | | | | | | | | | | X | X | X | X | X | " |
| 1 | 0 | 1 | 0 | 1 | | | | | | | | | X | X | X | X | X | X | " |
| 1 | 0 | 1 | 1 | 0 | SA SIZE SELECTION | | | | | | | X | X | X | X | X | X | X | " |
| 1 | 0 | 1 | 1 | 1 | | | | | | | X | X | X | X | X | X | X | X | " |
| 1 | 1 | 0 | 0 | 0 | | | | | | X | X | X | X | X | X | X | X | X | " |
| 1 | 1 | 0 | 0 | 1 | | | | | X | X | X | X | X | X | X | X | X | X | " |
| 1 | 1 | 0 | 1 | 0 | | | | X | X | X | X | X | X | X | X | X | X | X | " |
| 1 | 1 | 0 | 1 | 1 | | | X | X | X | X | X | X | X | X | X | X | X | X | " |
| 1 | 1 | 1 | 0 | 0 | | X | X | X | X | X | X | X | X | X | X | X | X | X | " |
| 1 | 1 | 1 | 0 | 1 | X | X | X | X | X | X | X | X | X | X | X | X | X | X | " |
| 1 | 1 | 1 | 1 | 0 | X | X | X | X | X | X | X | X | X | X | X | X | X | X | " |
| 1 | 1 | 1 | 1 | 1 | X | X | X | X | X | X | X | X | X | X | X | X | X | X | 524KB |

Accordingly, microcode and system tables may reside in the SA part of central storage outside of the system users absolute addressing range concurrently with problem programs, system control programs and data residing inside of the system users absolute address range of central storage.

The hardware in FIG. 5 enforces the code rules stated in Table-1. The inputs to the SA access check circuits 14 are BCA bits 8–12 (comprising the SA code in the selected entry), absolute address bits 10–16 from PIR 20, and authority bit 55 from PIR 20.

Access to the system area is controlled by the processor requesting the access by it controlling the setting of bit 55 in the PIR in the SC. An authorization check is made in circuits 14 by testing the requested absolute address against the SA code stored in the BCA array for that absolute address to determine if processor authority has been given to access the absolute address within the designated SA, and prohibiting the access if it is within the SA when no authority exists.

In FIG. 5, an AND circuit 40 generates a signal which inhibits an access request when all of the following conditions 1, 2, 3 and 4 occur:

1. PIR bit 55 is set to zero to indicate that no authority has been given for the absolute address in PIR 20 to access the system area. (Access authority to SA is signalled when bit 55 is set to 1.) An inverter 41 then provides a conditioning signal to AND circuit 40, so that it is able to generate an "inhibit access" signal to port and BSM select circuits 12 and to section select modifier circuits 13 when bit 55 is set to zero to prohibit any access to central storage. The "inhibit access" signal also causes an address violation signal to be returned to the processor issuing the command so that corrective action can be taken for the improper command.

2. The high-order SA existence bit 8 is set to one in the selected BCA entry. If bit 8 is set to zero, then this BCA entry does not contain any SA. Bit 8 directly conditions an input to AND circuit 40 on line 43.

3. The SA is correctly located in the selected BSM by AND circuit 42 being activated. When PIR bits 10, 11, 12 are all ones, the PIR address is within the highest 542KB of the absolute address fraction assigned to contain the SA in the selected BSM. Hence, AND circuit 42 is only activated for addresses in the highest 524KB part of the selected BSM. (Note that any of the eight address fractions of 524KB in the BSM could be theoretically be selected by controlling the states of bits 10, 11, 12 which enable AND circuit 42.)

4. SA size check line 45 is active, indicating that the absolute address in PIR 20 is within the specific SA size defined by the SA code bits 9, 10, 11, 12 in the selected BCA entry. The code may define any SA size from 32KB up to 524KB in 32KB increments. The SA size check circuits are comprised of Inverter, NOR and AND NOT circuits 46–60 in FIG. 5. The complement of the selected entries SA code bits 9, 10, 11, 12 define the lower limit of the SA within the assigned fraction in the selected BSM section. The highest address of the SA is architecturally defined as the highest address in that BSM section. The circuits 46–60 determine when the absolute address bits 13, 14, 15, 16 (which change at 32KB boundaries) is equal to or greater than the SA lower limit defined by SA code bits 9, 10, 11, 12 to activate a conditioning signal on line 45 to AND circuit 40 if the absolute address is equal to or above the lower limit.

Therefore, if PIR bit 55 is 1 and the address in PIR 20 is within the SA, access is permitted to central storage. Also, if authority bit 55 is 1 and the address is outside the SA, access is permitted to central storage. But if bit 55 is zero, access is only permitted for addresses outside the SA.

When the access is allowed, the section select address bits are gated into bit positions 2 and 3 in the storage input register (SIR) 24 in FIG. 1. Bit positions 4–63 in SIR 24 directly receive bits 4–63 from PIR 20. Then the SIR content is transferred to BSM control register 25, from which its bits 2, 3, 10–18, 21–28 are outputted as a 19 bit address to the selected BSM to physically locate the required double word.

FIGS. 11A and 11B illustrate in detail the logical content of a BSM controller, and how it connects to two ports, P0 and P1, which are exemplary of how any BSM controller may be connected to any pair of ports.

In any single port, the signals on its lines are activated in the following order:

1. One of the ports (in FIGS. 2 and 3) is first activated to select one of the BSMs A or B in FIG. 11A.
2. The command is then transferred on the 72 CMD/DATA lines to the command register associated with the selected BSM in FIG. 11B.
3. The data select lines (RQID) to the same BSM are activated (see FIG. 10A).
4. From one to 16 double words (DWs) of data are transferred sequentially between the data register associated with the selected BSM via a set of odd and even registers. The DWs also are transferred between the data register and the selected port to complete the data transfer path between the BSM and the requesting processor.
5. The BSM status line is activated after the data transfer, the status signals accumulated in status circuits P0 or P1 by well known means (not shown) are transferred on the command/data bus to the SC.

To enhance the access speed of each BSM, a pair of double words and their ECC (144 bits) are simultaneously written or fetched in the BSM. This is shown in FIG. 9. The DWs are written or read out in parallel from or to a data buffer in the BSM. Then the double words in the pair are separately and alternately read out from, or written in, an odd register and an even register associated with the respective BSM. The odd register transfers each double word with an odd DW address in the pair, and the even register transfers the DW with the even address in the DW pair. These registers are sequentially read out in a staggered fashion every 25 NS as shown in FIG. 9 to the 75 bit command/data lines.

While the invention has been particularly shown and described with references to preferred embodiments thereof, it will be understood by those skilled in the art that the foregoing and other changes in form and details may be made therein without departing from the spirit and scope of the invention.

Having thus described my invention, what I claim as new, and desire to secure by Letters Patent is:

1. A storage control for configuring and accessing a main storage in a data processing system, comprising:
    a plurality of basic storage modules (BSMs) in the main storage selectable by the storage control,
    BSM control means connected to the BSMs for storing an operational main storage configuration, comprising a plurality of entry registers in the BSM control means, each entry register being associated with a range of absolute addresses to be accessed in main storage, each entry register being settable to the address of any BSM selectable by the storage control,
    means for loading values into the entry registers in the BSM control means,
    an input register for receiving an access command for accessing an addressable unit of data in main storage, the access command containing an absolute address and command bits,
    entry addressing means for selecting one of the entry registers in the BSM control means, means connecting a first set of bit positions of the input register to the entry addressing means, wherein at least one bit position in the first set of bit positions addresses the absolute address boundaries which are spaced by an amount equal to the size of a BSM,
    and means for selecting a BSM by receiving the BSM address in a selected entry register for activating a signal to the addressed BSM,
    whereby a set of values loaded into the entry registers assigns absolute addresses to the different parts of the plural BSMs to obtain a main storage configuration.

2. A storage control as defined in claim 1, the entry addressing means further comprising:
    means connecting a second set of bit positions of the input register to the entry addressing means, a lowest-order absolute address bit in the second set addressing absolute address boundaries spaced by an amount equal to the size of a BSM range of absolute addresses associated with a single register entry in the BSM control means, and
    generating means in the entry addressing means for concatenating the first and second sets of bit positions received from the input register to generate an entry address for selecting an entry register in the BSM control means,
    whereby sequentially addressed data is accessed sequentially in selected BSM sections.

3. A storage control as defined in claim 1, interleave groups being controlled by the entry addressing means, further comprising:
    means connecting a third set of bit positions of the input register to the entry addressing means, a lowest-order absolute address bit in the third set addressing absolute address boundaries spaced by an amount equal to an interleave group size,
    generating means in the entry addressing means for concatenating the first and third sets of bit positions received from the input register to generate an entry address for selecting an entry register in the BSM control means, and
    whereby sequentially addressed interleave groups are accessed in interleaved BSM sections.

4. A storage control as defined in claim 1, interleave groups being controlled by the entry addressing means, further comprising:
    first gating means connecting a second set of bit positions of the input register to the entry addressing means, a lowest order absolute address bit in the second set addressing absolute address boundaries spaced ay an amount equal to the size of a BSM range of absolute addresses associated with a single entry register in the BSM control means, and
    second gating means connecting a third set of bit positions of the input register to the entry addressing means, a lowest-order absolute address bit in the third set addressing absolute address boundaries spaced by an amount equal to an interleave group size,
    an interleave mode registering means for indicating a system selection of non-interleave mode or interleave mode operation, the non-interleave mode setting enabling the first gating means to pass the second set of bit positions, the interleave mode setting enabling the second gating means to pass the third set of bit positions,
    the outputs of the first and second gating means being connected to the entry addressing means,
    generating means in the entry addressing means for concatenating the first set with either the second or third set of bit positions received from the input register to generate an entry address for selecting an entry register in the BSM control means, whereby the non-interleave mode causes sequentially addressed data to be accessed sequentially in selected BSM sections, and the interleaved mode causes sequentially addressed interleave groups to be accessed in interleaved BSM sections.

5. A storage control as defined in claim 1, plural ports being provided at an interface to the main storage, further comprising:
 each entry register containing at least a port select field, and a BSM select field,
 port and BSM select circuits for selecting one of plural ports and BSMs,
 means connecting the port select field and BSM select field from a selected entry register to the port and BSM select circuits to enable the selection of one of the plural ports and BSMs,
 a plurality of port busses connected between the BSM control means and the plural ports, and
 BSM controller means connected between at least one port bus and at least one BSM.

6. A storage control as defined in claim 5, the port and BSM select circuits further comprising:
 a plurality of AND circuits having inputs combinatorially connected to bits in the port select field and to bits in the BSM select field for a selected entry register, an output of each AND circuit providing a single selectable combination of one of the ports and one of the BSMs of the system, the outputs being connected to BSM select lines in the port busses.

7. A storage control as defined in claim 5, further comprising:
 each entry register also containing a section modifier field for controlling the selection of a particular section within a selected BSM,
 section select modifier circuits for providing the section address of a particular section selected in a BSM,
 address lines associated with each port bus having section address component lines, the section address component lines being connected to the section select modifier circuits,
 whereby the section select modifier circuits activate the section address component lines in a selected port bus.

8. A storage control as defined in claim 7, the section select modifier circuits further comprising:
 a plurality of Exclusive-OR circuits, each having an input receiving a respective bit in the section modifier field of a selected entry register,
 means connecting a second set of bit positions of the input register respectively to other inputs of the plurality of Exclusive-OR circuits, a lowest-order absolute address bit in the second set having absolute address boundaries spaced by an amount equal to the size of a BSM range of absolute addresses associated with a single entry register in the BSM control means, and
 means connecting the outputs of the Exclusive-OR circuits to respective bit positions in a high-order end of a storage input register for containing the address to be sent to a selected BSM.

9. A storage control as defined in claim 7, further comprising:
 a system area (SA) being providable within the BSM section selectable by an entry register,
 each entry register also containing a system area range select field for controlling the existence and size of any SA, at least one of the bits of the SA range select field indicating the existence of a SA in the BSM section represented by each selectable entry register,
 SA access check circuits for receiving the SA range select field in a selected entry register,
 means connecting another input of the SA access check circuits to a fourth set of bit positions of the input register, a lowest-order absolute address bit in the fourth set addressing absolute address boundaries spaced by an amount equal to an incremental unit in the size of the SA, a highest-order absolute address bit in the fourth set addressing absolute address boundaries related to the maximum size permitted for the SA,
 SA check comparing means for comparing the fourth set of bit positions with the SA size specified by an equal number of bits in bits in the SA range select field of the selected entry register to determine if the absolute address in the input register is within the specified SA range.

10. A storage control as defined in claim 9, further comprising:
 an authorization field in the input register for indicating if the absolute address in the input register is authorized to access the SA,
 an access inhibit gate, means connecting an input of the access inhibit gate to the authorization field, the access inhibit gate being conditioned by a no authorization setting of the authorization field, the access inhibit gate being enabled when all of its inputs are conditioned,
 means connecting the existence bit in the SA range select field to another input of the access inhibit gate to condition the gate only when an SA exists in the selected BSM section,
 the access control gate being also conditioned by an output of the SA check comparing means when the absolute address is within the SA,
 whereby enablement of the access inhibit gate indicates the absolute address in the input register will not be permitted to access main storage because the address is not authorized to access the SA.

11. A storage control means as defined in claim 10, further comprising:
 a plurality of AND circuits having inputs combinatorially connected to bits in the port select field and to bits in the BSM select field for a selected entry register, an output of each AND circuit providing a single selectable combination of one of the ports and one of the BSMs of the system, the outputs being connected to BSM select lines in the port busses, and
 an inhibit access line being connected from the output of the access inhibit gate to an input of each of the plurality of AND gates to inhibit the port and BSM selection by an unauthorized access request to main storage.

12. A storage control means as defined in claim 11, further comprising:
 means for blocking the transfer of an address for an unauthorized access request to main storage, the address including a BSM section select address component,
 the inhibit access line being also connected to the blocking means to inhibit the transfer of the address for an unauthorized access request.

13. A storage control as defined in claim 10, further comprising:

an SA location AND gate for signalling when the SA is located in a predetermined port of the BSM selected to contain the SA, a fifth set of consecutive bits in the input register being connected to inputs of the SA location AND gate, the fifth set having its lowest-order bit change at absolute address boundaries spaced by the maximum size permitted for the SA, the highest-order bit in the fifth set being adjacent to the absolute address bit position which changes at absolute address boundaries spaced by the size of the BSM, an output of the SA location AND gate being connected to another input of the access inhibit gate to prohibit its enablement when the absolute address in the input register is not in the SA location predetermined in the BSM.

14. A storage control as defined in claim 13, further comprising:

the SA location AND gate being directly connected to the state of each bit in the fifth set in the input register, the SA location AND gate being enabled only when every bit in the fifth set is set to its highest value, whereby the SA range is predetermined to be at the highest absolute address end of the selected BSM.

15. A storage control as defined in claim 9, the SA check comparing means further comprising:

a first input receiving the SA size code bit signals from the SA range select field in the selected entry register, a second input receiving the state signals of the fourth set of bit positions in the input register, logic circuits connected to the first and second inputs to compare corresponding bit positions of the code bit signals and the input register state signals, an output of the logic circuits being activated when the value represented by the state signals equals or exceeds the value represented by the code bit signals.

16. A storage control as defined in claim 15, the logic circuits further comprising:

a plurality of bit compare circuits, each bit compare circuit including a highest-order circuit and a lowest-order circuit having first and second inverter circuits, an input to the first inverter in each bit compare circuit being connected to a respective bit signal of the SA size code in the order sequence of the SA range select field of the selected entry register, an input to the second inverter in each of the groups being connected to a corresponding-order bit signal of the fourth set of the input register, a NOR circuit in each of the groups, except the lowest-order circuit, having inputs connected in parallel to the inputs of the first and second inverter circuits in the group, an output inverter circuit having an input connected in common to outputs of both inverters in the highest-order circuit, a plurality of AND-INVERT circuits associated with each bit compare circuit except the highest-order circuit, each AND-INVERT circuit having an input connected in common to outputs of both inverter circuits in the same bit compare circuit except the highest-order circuit, additional inputs of each AND-INVERT circuit being connected to an output of each NOR circuit in each bit-compare circuit having a higher-order than the bit-compare circuit containing the AND-INVERT circuit, and an output of the logic circuits being connected in common to outputs of the output inverter circuit and outputs of each of the AND-INVERT circuits.

* * * * *